J. M. LIEB.
SWITCH CONTROLLING MECHANISM.
APPLICATION FILED OCT. 22, 1908.
12,901. Reissued Dec. 29, 1908.
3 SHEETS—SHEET 1.
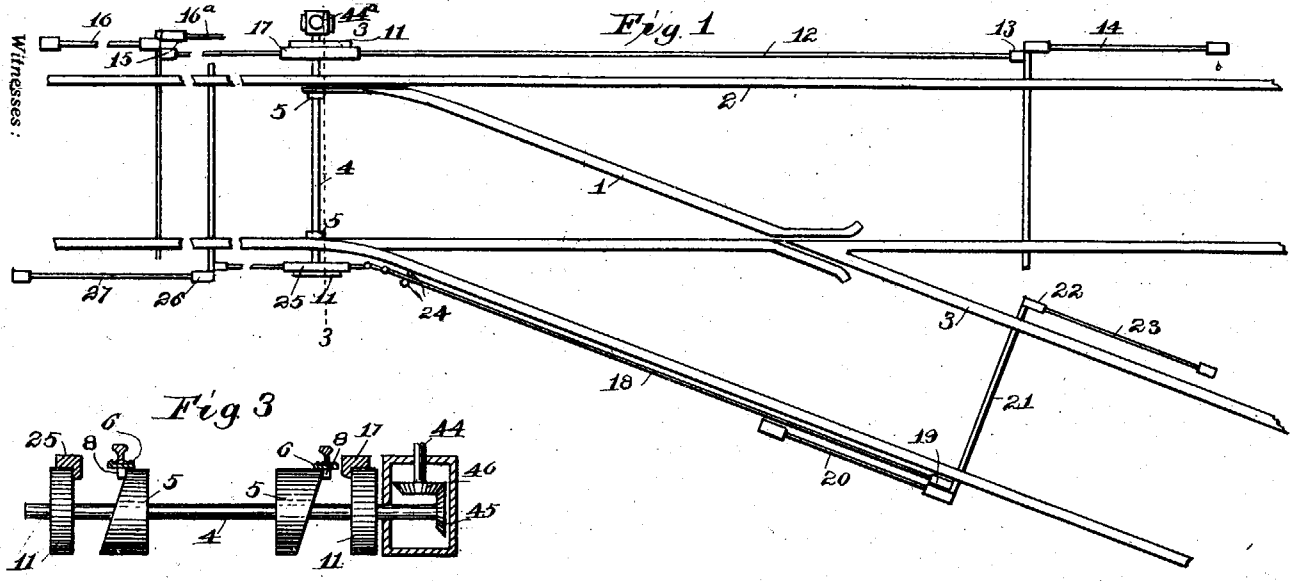
Fig. 1
Fig. 3
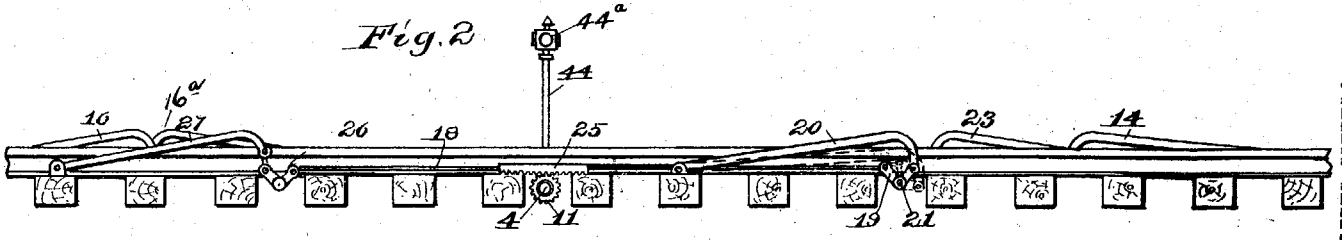
Fig. 2
Witnesses:
A. Rager.
H. Randolph.
Inventor.
John M. Lieb
By Geo. W. Rightmire
Attorney.
THE NORRIS PETERS CO., WASHINGTON, D. C.

J. M. LIEB.
SWITCH CONTROLLING MECHANISM.
APPLICATION FILED OCT. 22, 1908.
12,901. Reissued Dec. 29, 1908.
3 SHEETS—SHEET 2.
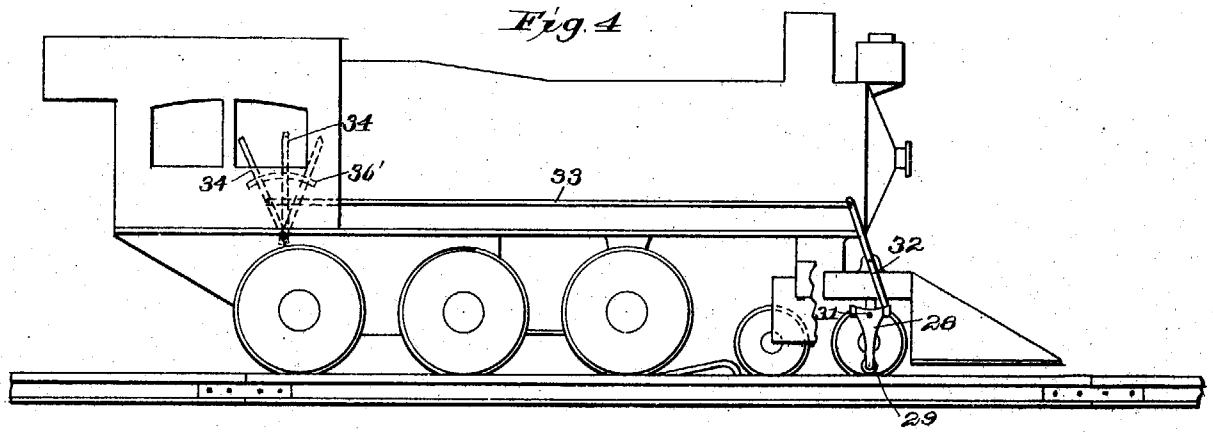
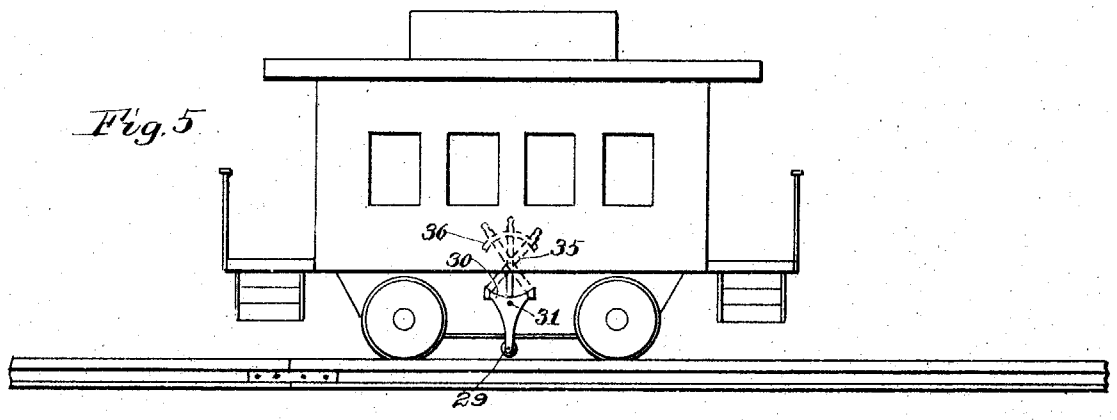
*Witnesses:*
A. Rager
H. Randolph.
*Inventor.*
John M. Lieb
by Geo. W. Rightmire
*Attorney.*
THE SAMUEL PETERS CO., WASHINGTON, D. C.

J. M. LIEB.

SWITCH CONTROLLING MECHANISM.

APPLICATION FILED OCT. 22, 1908.

12,901. Reissued Dec. 29, 1908.

3 SHEETS—SHEET 3.

Witnesses:

A. Rager

H. Randolph.

Inventor.

John M. Lieb by

Geo. W. Rightmire

Attorney.

THE NORRIS PETERS CO., WASHINGTON, D. C.

UNITED STATES PATENT OFFICE.

JOHN M. LIEB, OF COLUMBUS, OHIO.

SWITCH-CONTROLLING MECHANISM.

No. 12,901. Specification of Reissued Letters Patent. Reissued Dec. 29, 1908.

Original No. 888,915, dated May 26, 1908, Serial No. 356,119. Application for reissue filed October 22, 1908. Serial No. 459,101.

*To all whom it may concern:*

Be it known that I, JOHN M. LIEB, a citizen of the United States, residing at Columbus, in the county of Franklin and State of Ohio, have invented new and useful Improvements in Switch-Controlling Mechanism, of which the following is a specification.

The invention relates to an improvement in switch controlling mechanism comprehending specifically a structure whereby the moving vehicle can absolutely control the position of the switch either from the siding or main track.

The main object of the present invention is the production of a switch operating mechanism including a series of positively connected bars and levers whereby a setting shaft may be operated to actuate the switch in the travel of the train.

The invention will be described in the following specification, reference being had particularly to the accompanying drawings, in which—

Figure 8:
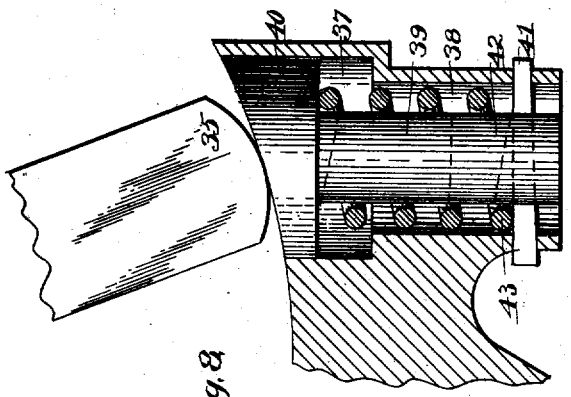
Figure 9:
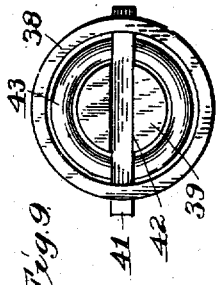
Figure 6:
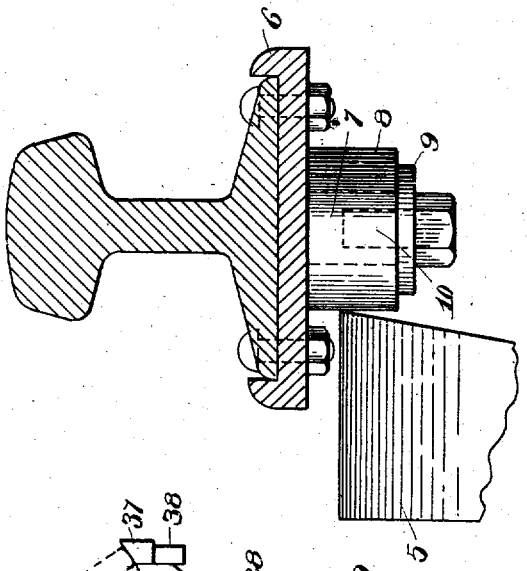
Figure 7:
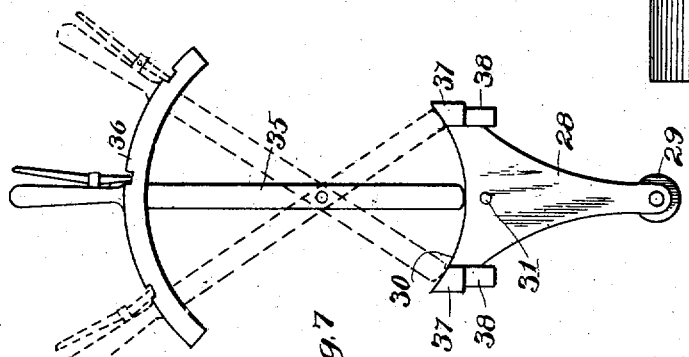

Figure 1 is a plan illustrating the application of my improved operating mechanism to a short section of the main track and siding, Fig. 2 is a side elevation of the same, Fig. 3, is a section on line 3—3 of Fig. 1, Fig. 4 is a side elevation of a locomotive showing the trips carried thereby for operating the mechanism, Fig. 5 is a similar view of a car showing the trips carried thereby, Fig. 6 is an enlarged sectional view illustrating the connection between the cam disks and the switch points, Fig. 7 is an enlarged view in elevation illustrating the means carried by a moving vehicle for operating the switch levers, Fig. 8 is an enlarged broken sectional view showing the yielding connection between the lever setting plate and the manually controlled arm of the vehicle operating means, Fig. 9 is a bottom plan of said yielding connection.

Referring particularly to the drawings my improved switch operating mechanism is designed for use with a switch 1 leading from a main track 2 onto a siding 3, and is designed to provide a means whereby the train traveling on the main track or siding may properly control the switch.

In structure the operating mechanism comprises a setting shaft 4 supported in bearings beneath the main track and directly underlying the switch point. On the shaft secured in spaced relation are opposing cam disks 5, the relatively outer or remote surfaces of which provide cam surfaces to engage the respective switch points. For the purpose of this engagement each switch point is provided with a clip plate 6 securely bolted to the point and provided with a depending stud 7, on which is movably mounted a roller 8 secured in place by a washer 9 held by a headed bolt 10 having threaded engagement with the stud 7. The disposition and arrangement of the cams 5 are such that in the revolution of the shaft in one direction the cam surface of one disk will force the switch points in one direction and in movement of the shaft in the opposite direction the cam surface of the other disk will force the points in the opposite direction, as will be apparent from Fig. 3. Beyond the rails and the main track 2 the shaft 4 is provided with gear pinions 11.

Beyond the outer rail of the main track is arranged an operating rod 12, which at one end is connected to one arm of a right angle lever 13 pivotally supported at the juncture of its arms on any desired support. The other arm of the lever 13 is connected to the trip lever 14 which is approximately of L-shape, the short arm of the lever being connected to the angle lever 13, and the long arm thereof pivoted to a support secured upon the ties. The lever 14 is so arranged that in normal position it will project above the surface of the adjacent rail. The opposite end of the rod 12 is similarly connected to a right angle lever 15 which in turn is connected to an L-shaped lever 16, similar to the lever 14. The bar 12 passes directly above one of the gear pinions 11, and at this point is formed with a rack bar 17 arranged to engage said pinion, whereby in the reciprocation of the rod the pinion 11, and, therefore, the shaft 4 is partially rotated. Beyond the relatively remote rail of the siding 3 is arranged a second operating bar 18, which at a point sufficiently remote from the switch is connected to a right angle lever 19 in turn connected to an L-shaped lever 20, respectively similar to the levers 13 and 14 previously described. In this instance the right angle lever 19 is secured upon a pivot rod 21 extending transverse to the siding track, and provided beyond the opening rail of said track with a similar right angled lever 22, said lever 22 being in turn connected to an L-shaped lever 23. The levers 20 and 23 project in relatively reverse directions from the shaft 21, that is the lever 20 extends from the shaft in the same direction as the rod 18, while the lever 23 extends in the opposite direction.

The rod 18 at approximately the juncture of the siding with the main track passes between guide pins 24 to insure alinement of said rod in operation, being beyond said pins extended lengthwise the main track. The rod 18 extends above the remaining pinion 11 and is provided with a rack 25 continually in mesh with said pinion and adapted to operate the same in the reciprocation of the rod. At a point remote from the pinion 11 the rod 18 is provided with a right angled lever 26 in turn connected to an L-shaped lever 27. Levers 16 and 16ª, and 14, which are connected to the rod 12, are so arranged that depression of any one lever will actuate the rod 12 to close the switch. Lever 20 is opposed to lever 27, while lever 23 is opposed to lever 20.

The locomotive and rear car of the train are provided with a trip plate 28, approximately of triangular shape in elevation and carrying at the lower end a roller 29 to engage and operate any of the operating levers previously described. The trip plate is concaved at its upper edge as at 30, and is pivotally supported on the locomotive or car structure immediately below and centrally of the curved edge 30, as at 31. The trip plate on the locomotive is operated through a pivot bar 32 connected at its upper end to a rod 33 extending within the cab of the locomotive and controlled through the lever 34 and notched segment 36′. The lower end of the bar 32 is disposed in contact with the curved edge 30 of the trip plate, the curvature of said edge being on the arc struck from the pivotal support of the bar 32 as a center.

The trip plate supported on the car is operated through a hand controlled lever 35, pivotally supported at the center of curvature of the edge 30 of the plate and coöperating with the usual notch segment 36 formed to secure the lever in any one of three adjusted positions. The respective ends of the curved edge 30 of the trip plate are recessed to form socket members 37, reduced in diameter at their lower portion, as at 38. Pins 39 are slidably supported in the sockets, being provided with heads 40 arranged in the path of movement of the respective lever bars and conforming on their upper surfaces to the normal curvature of the upper edge of the trip plate. A pin 41 is inserted transverse the socket walls, passing through a longitudinally disposed slot 42 in the pin 39, said pin serving as a lower support for a coil spring 43 arranged to encircle the rod and bear at its upper end beneath the head 40.

Owing to the curvature of the edge 30 of the trip plate it is obvious that when the levers 32 or 35 are disposed vertically, said plate is free to swing on its pivot in either direction, so if the roller 29 engages one of the operating levers with the parts in this position, said trip plate is swung on its pivot without affecting said operating lever. In the event the lower end of the lever bar is moved into engagement with the rear end of the edge 30 of the trip plate, that is to overlie the head 40 of the pin at such rear end, the engagement of the roller 29 with either of the operating levers will insure operation of said levers, as the trip plate is prevented from moving in a rearward direction. The reverse position of the lever bars prevents swinging of the trip plate in the forward direction, hence will insure coöperation of said plate and the operating levers in the rearward travel of the vehicle. Provision is thus made for controlling and operating the switch actuating mechanism during travel of the train in either direction, as is, of course, to be desired under ordinary uses of sidings and switches.

A signal post 44 is revolubly supported adjacent the track rails of the main track, and the shaft 4 is terminally provided immediately beneath said post with a gear 45 arranged to mesh with a gear 46 secured on the post, whereby rotation of the shaft 4 serves to similarly rotate the post 44. The signal lights of the post are so arranged that in one position of the latter, lights indicating a clear main track will be displayed, while in the opposing position signals indicating an open switch will be displayed.

In operation it will be understood that a train traveling the main track from the right as seen in Fig. 1, the switch being open, desiring to throw the latter to enable the train to continue along the main line, will operate the trip carried on the engine which will engage the lever 14, thereby rocking the angle lever 13, whereby the rod 12 is actuated longitudinally to rock the shaft 4 and close the switch, and at the same time the signal light 44ª will be set to display the signals indicating a closed switch. It is apparent that this signal light 44ª may be located at any desired point along the track, and it is not thought to involve invention to place the signal light at a remote point from the switch and connect the same operatively with the shaft 4. Assume that the train is traveling towards the right as shown in Fig. 1, and that the switch must be thrown in order to permit the train to move along the main track, operation of the lever 16 by the trip will operate to throw the switch as desired, thereby permitting the train to move along the main track. Assume that a train approaching from the left in Fig. 1, desires to enter the switch; the lever 27 will be depressed to open the switch, whereupon the train may pass upon the siding, and after entering upon the siding, operation of the lever 20 will cause the switch to be again closed. When the train desires to leave the switch, depression of the lever 23 by the trip will cause the switch to be thrown open to permit the train to pass off on to the main track, and after issuing on the main track, depression of the lever 16[a] will operate to again close the switch. In this manner provision is made for manipulating the switch as desired when the train is passing in either direction on the main track or in either direction on the switch. It is thus seen that a train moving towards the right on the main track in Fig. 1, may throw the switch to render it possible to continue on the main line or may throw the switch to render it possible to pass on to the siding, and after passing on to the siding, the manipulation of the lever 20 will enable the train thus on the switch to close the same. In passing from the switch on to the main line, the train may throw the switch to accomplish this purpose in passing out, and when upon the main line may operate lever 16[a] to close the switch again to make the main line continuous. When the train is approaching from the right as shown in Fig. 1, if the switch is so placed as to block the main line, depression of the lever 14 will cause the switch to be thrown to render the main line continuous. There is no occasion, when the train is passing towards the left on the main track as seen in Fig. 1, to manipulate the switch after having passed by the same, for the reason that a train coming from the left as seen in Fig. 1 may manipulate the switch as desired.

The essential feature of the present invention is the connection of the track levers so controlled by the arrangement of the trip plates on the engine or cars that the train approaching a switch on the main line, or traveling from the siding on to the main track may operate the switch in any manner desired, and after traveling beyond the switch, may reset the switch as desired. I do not, therefore, desire to be limited in any particular as to the specific arrangement of the track levers 14, 16, 16[a], 20, 23, and 27, contemplating such arrangement of the levers as will permit any operation of the switch desired or most usual in the particular track arrangement to which the invention is applied.

Having thus described the invention what is claimed as new is:—

1. A switch operating mechanism including a setting shaft, cam disks operated by said shaft and controlling the switch points, a trip plate carried by the vehicle and pivoted for free movement in either direction, a lever adapted for manual operation to be positioned to permit free movement of the trip plate, or to lock it against movement in one direction.

2. A switch operating mechanism including a setting shaft, cam disks operated by said shaft and controlling the switch points, a trip plate carried by the vehicle and pivoted for free movement in either direction, a lever adapted for manual operation to be positioned to permit free movement of the trip plate, or to lock it against movement in one direction, and spring pressed buffer plates carried by the trip plate to coöperate with the lever.

3. A switch operating mechanism including a setting shaft, cam disks operated by said shaft and controlling the switch points, a trip plate pivotally supported on the vehicle and adapted to engage and rock said shaft in either direction, a manually operable lever bar pivotally supported on the vehicle to coöperate with the trip plate, the lever engaging edge of said trip plate being curved on an arc having the pivotal support of the lever bar as a center.

4. A switch operating mechanism comprising a setting shaft, cam disks operated by said shaft and controlling the switch points, operating rods mounted lengthwise of the track rails and serving to actuate the cam disks, levers normally projecting above the plane of the rail and connected to and actuating the operating rods, a trip plate carried by the vehicle and pivoted for free movement in either direction, means carried by the trip plate to engage the levers, and means carried by the vehicle and adapted for manual operation to permit free movement of the trip plate or to lock it against movement in one direction.

In testimony whereof I affix my signature in the presence of two witnesses.

JOHN M. LIEB.

Witnesses:
G. E. TRUMP,
E. F. BERRY.